(12) United States Patent
Donnan

(10) Patent No.: US 12,536,890 B2
(45) Date of Patent: Jan. 27, 2026

(54) ALERT DEVICE

(71) Applicant: Joseph Donnan, Burr Ridge, IL (US)

(72) Inventor: Joseph Donnan, Burr Ridge, IL (US)

( * ) Notice: Subject to any disclaimer, the term of this patent is extended or adjusted under 35 U.S.C. 154(b) by 39 days.

(21) Appl. No.: 18/680,484

(22) Filed: May 31, 2024

(65) Prior Publication Data

US 2024/0404390 A1 Dec. 5, 2024

Related U.S. Application Data

(60) Provisional application No. 63/470,324, filed on Jun. 1, 2023.

(51) Int. Cl.
*G08B 21/18* (2006.01)
*B61L 1/06* (2006.01)

(52) U.S. Cl.
CPC ............. *G08B 21/182* (2013.01); *B61L 1/06* (2013.01)

(58) Field of Classification Search
CPC ................................. G08B 21/182; B61L 1/06
USPC ....................................................... 340/545.5
See application file for complete search history.

(56) References Cited

U.S. PATENT DOCUMENTS

| | | | | |
|---|---|---|---|---|
| 5,713,540 A * | 2/1998 | Gerszberg | ................. | B61L 1/06 73/645 |
| 8,803,698 B1 * | 8/2014 | Heydron | ............ | G01M 13/028 340/683 |
| 8,862,428 B2 * | 10/2014 | Lill | .................... | G05B 19/0428 701/99 |
| 11,447,166 B2 * | 9/2022 | Lang | ....................... | G08B 21/18 |
| 2007/0001059 A1 * | 1/2007 | Appleby | ................. | B61L 1/165 246/122 R |
| 2008/0303656 A1 * | 12/2008 | Mathews, Jr. | ............ | B61L 1/20 340/540 |
| 2009/0121863 A1 * | 5/2009 | Prior | ...................... | G08B 21/04 340/539.12 |
| 2010/0174490 A1 * | 7/2010 | McAhren | ................. | G01V 1/16 702/14 |
| 2011/0001812 A1 * | 1/2011 | Kang | ................. | G08B 21/0492 348/E7.085 |
| 2012/0274447 A1 * | 11/2012 | Hess | .................... | G08B 13/191 340/8.1 |
| 2014/0132418 A1 * | 5/2014 | Lill | .................... | G05B 19/0428 340/679 |
| 2014/0142858 A1 * | 5/2014 | Adams | ..................... | G01V 1/22 702/14 |
| 2015/0198939 A1 * | 7/2015 | Ander | ..................... | G05B 15/02 700/83 |
| 2015/0242822 A1 * | 8/2015 | Magara | ............ | G06Q 10/06311 705/305 |
| 2017/0267266 A1 * | 9/2017 | Schmidt | ................. | G01H 11/08 |
| 2018/0012480 A1 * | 1/2018 | Matsuoka | ................ | G08B 3/10 |
| 2018/0061207 A1 * | 3/2018 | Nygren | .................. | G01N 29/00 |
| 2018/0246234 A1 * | 8/2018 | Châtenay | ............... | G01V 1/104 |
| 2020/0023871 A1 * | 1/2020 | Snyder | .................. | B61L 25/021 |

(Continued)

*Primary Examiner* — Zhen Y Wu
(74) *Attorney, Agent, or Firm* — DOHERTY WALLACE PILLSBURY MURPHY

(57) ABSTRACT

An apparatus for detecting movement of an object of interest includes a battery, a vibration sensor in power communication with the battery, and an energy emitter in communication with the vibration sensor and configured to emit energy in response to the vibration sensor sensing vibration exceeding a threshold value to detect movement of the object of interest. A method for detecting movement of an object of interest is also provided.

8 Claims, 6 Drawing Sheets

(56) References Cited

U.S. PATENT DOCUMENTS

| | | |
|---|---|---|
| 2020/0059113 A1* | 2/2020 | Thirumalai Ananthan Pillai ........ H02J 50/60 |
| 2021/0083498 A1* | 3/2021 | Cho ...................... H02J 7/0048 |
| 2021/0383662 A1* | 12/2021 | Gruber ..................... G01D 5/20 |
| 2023/0286555 A1* | 9/2023 | Simon ..................... B61L 27/20 |
| 2024/0089648 A1* | 3/2024 | Rachoori ............. H04R 1/1033 |
| 2024/0203767 A1* | 6/2024 | Kode ................ H01L 21/67276 |

* cited by examiner

__ALERT DEVICE__

CROSS REFERENCE TO RELATED APPLICATION

This application claims the benefit of an earlier filing date from U.S. Provisional Application Ser. No. 63/470,324 filed Jun. 1, 2023, the entire disclosure of which is incorporated herein by reference.

BACKGROUND

In industrial and transportation industries, inadvertent movement of objects, such as cargo and railroad cars for example, can lead to damage costing large sums of money. Accordingly, there is need in the industrial and transportation fields for apparatuses and methods to warn of movement of objects of interest to prevent or limit damage or even prevent physical injury or death under certain circumstances.

SUMMARY

Disclosed is an apparatus for detecting movement of an object of interest. The apparatus includes a battery, a vibration sensor in power communication with the battery, and an energy emitter in communication with the vibration sensor and configured to emit energy in response to the vibration sensor sensing vibration exceeding a threshold value to detect movement of the object of interest.

Also disclosed is an apparatus for detecting movement of an object of interest. The apparatus includes a base, a rechargeable battery disposed in a battery box in the base, a base cover configured to enclose a bottom portion of the base, electronics disposed in the base, and a vibration ball switch sensor in power communication with the battery and coupled to the electronics, wherein the base cover is secured to the base by a first threaded connection. The apparatus also includes a light emitter comprising a plurality of light-emitting-diodes (LEDs) and coupled to the electronics, a lens at least partially enclosing the light emitter; a sound emitter coupled to the electronics, and a sound emitter cover at least partially surrounding the sound emitter, wherein the lens is secured to the base by a second threaded connection. The apparatus further includes an on-off switch disposed in the base and coupled to the electronics and in power communication with the battery, a pliable switch cover disposed over and sealing the on-off switch, and a standby indicator light coupled to the electronics and configured to indicate that the apparatus is operational. The apparatus further includes a charging port disposed in the base and in power communication with the battery, the charging port configured to interface with a charging plug of a charging cable, and a charging indicator light coupled to the electronics and configured to indicate charging of the battery.

Further disclosed is a method for detecting movement of an object of interest. The method includes using an alert device comprising a battery, a vibration sensor, and an energy emitter in communication with the vibration sensor and configured to emit energy in response to the vibration sensor sensing vibration exceeding a threshold value. The method also includes placing the alert device on an object of interest subject to movement and/or another object subject to vibration related to movement of the object of interest. The method further includes sensing a vibration level that meets or exceeds a vibration threshold value, and emitting energy from the energy emitter in response to the vibration sensor sensing vibration exceeding the threshold value to detect movement of the object of interest.

The above and other features of the invention, including various novel details of construction and combinations of parts, will now be more particularly described with reference to the accompanying drawings. It will be understood that the particular devices and method embodying the invention are shown by way of illustration only and not as limitations of the invention. The principles and features of this invention may be employed in various and numerous embodiments without departing from the scope of the invention.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Disclosed are embodiments of an alert device for warning a user of an inadvertent movement of an object of interest. The alert device senses vibration of an object to which the alert device is resting on or coupled to. Upon the device sensing a vibration that exceeds a threshold level, the alert device emits a light signal and/or an acoustic signal (i.e., sound signal) to provide an alert signal that warns the user of the inadvertent movement of the object of interest. The alert signal is provided by a sequence of alert signals in which each alert signal is emitted for a time interval $T_{ON}$ followed by a time interval $T_{OFF}$ in which no signal is emitted. The sequence of alert signals is intended to avoid the user from having a continuous alert signal blend into background noise and thus ignoring it. The alert device can be placed on the object of interest or on a nearby object that would be subject to vibration caused by movement of the object of interest. Protection from the environment is provided by sealing the alert device from environmental elements such as water and dust.

Figure 1:
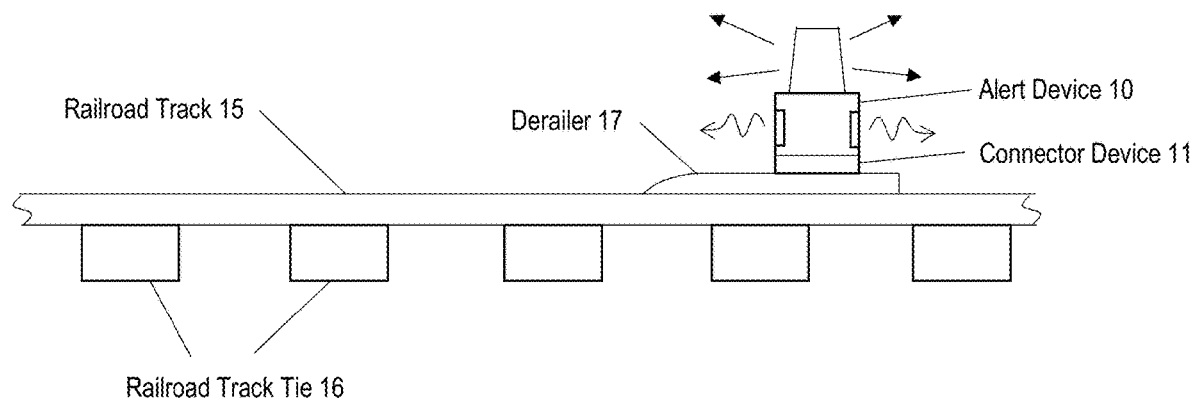
FIG. 1 depicts aspects of an alert device mounted atop of a derailer disposed on a railroad track.

FIG. 1 illustrates an alert device 10 disposed on a derailer 17 that is configured to derail a railroad car moving inadvertently on railroad tracks 15 supported by railroad track ties 16. The alert device 10 may be placed on the derailer 17 and held in place by gravity or the alert device 10 may include a connecting device 11 configured to grasp the derailer 17. Non-limiting embodiments of the connecting device 11 include a magnet, a clamp, and a suction cup.

Figure 2:
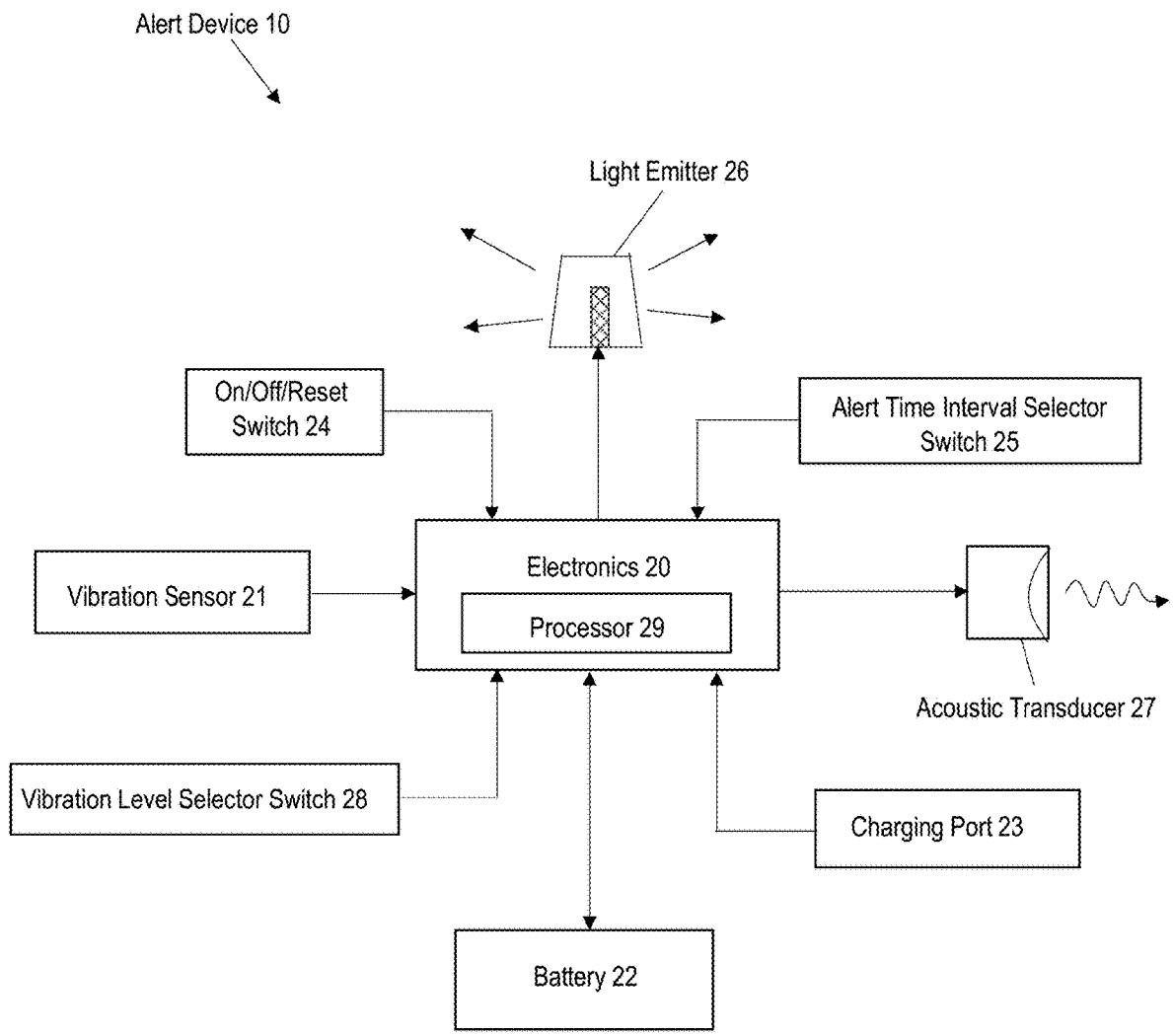
FIG. 2 is a schematic diagram depicting aspects of the alert device depicted in FIG. 1.

FIG. 2 is a schematic diagram depicting aspects of the alert device 10. The alert device 10 includes electronics 20 configured for operating the alert device 10. Operations include receiving inputs such as power input, battery charging input, and selection of certain operational parameters and providing outputs such as driving a light emitter and/or a sound emitter. The electronics 20 may include a driving or amplifier circuit for driving output devices. The electronics 20 may include a processor 29 for processing operational parameter inputs and operating the alert device in accordance with the selected operational parameters. The processor 29 may be a digital processor or an analog processor or a combination of each. The processor 29 may be part of a processing system having memory and input and/or output interfaces. The electronics 20 may also include a charging circuit for receiving external power and charging an internal battery. The electronics 20 may also include timing circuits to control timing of the alert signal such as pulsing to provide a series of alert signals according to a selected timing protocol. Alternatively or in addition, the timing may be implemented by programming the processor 29.

Still referring to FIG. 2, the alert device 10 includes a vibration sensor 21 configured to sense vibration and provide a signal to the electronics 20 related to a level of sensed vibration. Non-limiting embodiments of the vibration sensor 21 include an electro-mechanical vibration sensor such as a vibration ball switch sensor, a piezo-electric vibration sensor, and an accelerometer. The alert device 10 may include multiple vibration sensors 21 where each vibration sensor 21 has a unique integral setpoint to trigger the alert device to output the alert signal. Hence, an input selector switch can be used to select the triggering setpoint. In embodiments using an accelerometer or an analog output vibration sensor device, a triggering setpoint or multiple setpoints can be programmed into non-transitory memory readable by the processor 29.

Still referring to FIG. 2, the alert device 10 includes a battery 22 for powering the alert device 10. The battery 22 can be a rechargeable battery such as a lithium-ion battery or a nickel-cadmium battery in non-limiting embodiments. Alternatively, the battery 22 may be a non-rechargeable battery such as an alkaline battery in a non-limiting embodiment.

Still referring to FIG. 2, the alert device 10 includes a charging port 23 for providing external power for charging the battery 22 that is rechargeable. The charging port 23 may include conductors for contacting mating conductors in a charging cable plug. In one or more embodiments, the charging cable plug may be held in place by a magnet. Alternatively, a charging cable for connecting to the port 23 may include a coil for conducting alternating current to generate a varying magnetic field. The varying magnetic field extends beyond a sealed portion of the port 23 that prevents external environmental elements from entering the alert device 10. The varying magnetic field induces a voltage and associated current in a conductor internal for the alert device 10. The induced voltage and current is used by a charging circuit in the electronics 20 to charge the battery 22. In one or more embodiments, the opposing end of the charging cable may have a USB-type connector for receiving power.

Still referring to FIG. 2, the alert device 10 includes a light emitter 26 configured to emit light as an alert light signal. In one or more embodiments, the light emitter includes a light emitting diode (LED) covered by a protective translucent enclosure or lens and operated by the electronics 20. In one or more embodiments, the light emitter 26 is an assembly of LEDs mounted on a structure referred to as a tree. Other types of light emitters may also be used. The alert light signal may be continuous on while the alert signal is being emitted or it may be flashing while the alert signal is being emitted.

Still referring to FIG. 2, the alert device 10 includes an acoustic transducer (or speaker) 27 configured to convert an electrical driving signal from the electronics 20 to emit a sound alert signal. The emitted sound may be a continuous monotone or a pulsing monotone or the emitted sound may have a varying intensity and/or a varying frequency.

Still referring to FIG. 2, the alert device 10 includes an ON/OFF/RESET switch 24 coupled to the electronics 20 and configured to turn the alert device 10 on or off from a previous off or on status, respectively, or reset the alert device once it has been activated.

Figure 3:
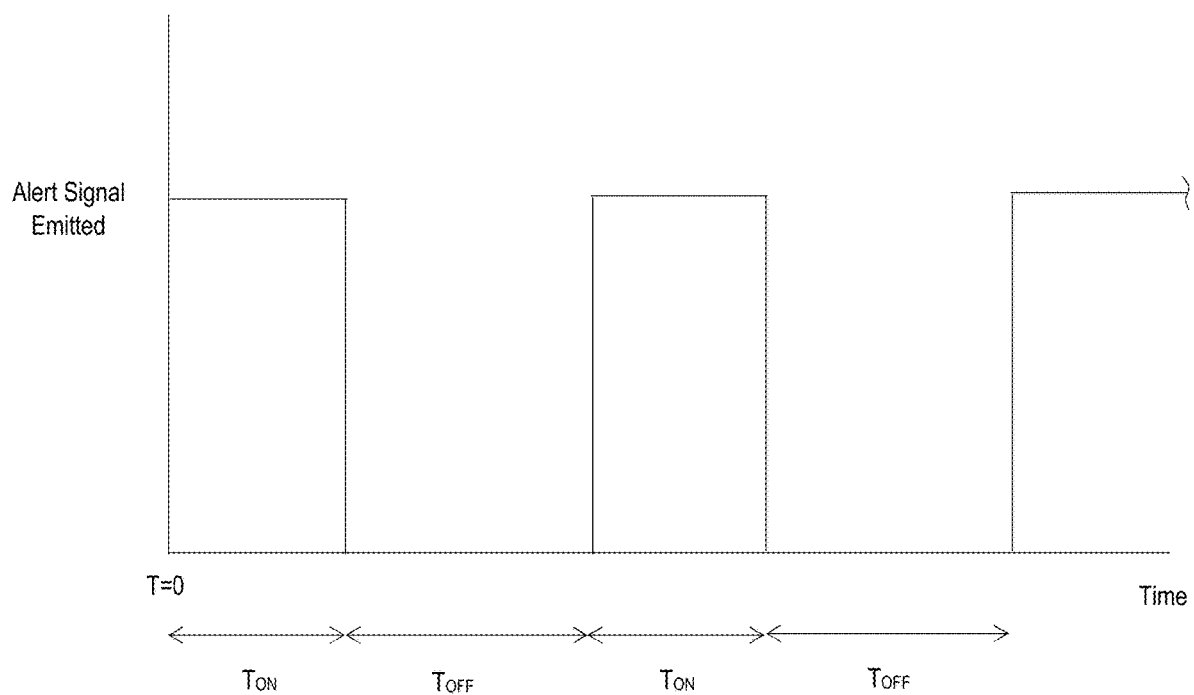
FIG. 3 depicts aspects of timing of a sequence of alert signals.

Still referring to FIG. 2, the alert device 10 includes an alert time interval selector switch 25 coupled to the electronics 20 and configured to input a first time interval during the which the alert signal is emitted and/or a second time interval (following the first time interval) during which the alert signal is not emitted. FIG. 3 illustrates an example of a sequence of alert signal emissions ($T_{ON}$) beginning at T=0 where each alert signal emission is followed by an off-period ($T_{OFF}$) where the alert signal is not emitted. As noted further above, the purpose of emitting the sequence of the alert signals is to avoid a continuous alert signal from blending into background noise and thus being ignored by a user. The alert time interval selector switch 25 can be configured to input values for $T_{ON}$ and/or $T_{OFF}$. Values for $T_{ON}$ and/or $T_{OFF}$ may be selected from preset values. Alternatively, the values for $T_{ON}$ and/or $T_{OFF}$ may be selected as specific values from a continuous spectrum of values. In yet another embodiment, the alert device 10 may not include the alert time interval selector switch 25 in that the alert device 10 may include only one preset value for $T_{ON}$ and one preset value for $T_{OFF}$. Preset timing values can be implemented by analog or digital timing circuits or programmed into firmware in the electronics 20. Specific timing values can be input into the processing system implemented by the electronics 20 using a user interface. Alternatively, fixed operational parameters may be built into circuits in the electronics 20. In embodiments of the alert device 10 having multiple pre-programmed timing setpoints, the alert time interval selector switch 25 can be used to select a user desired timing parameter. In one or more embodiments, the alert time interval selector switch 25 is configured to input between three and six timing values for the alert signal.

Referring back to FIG. 2, the alert device 10 includes a vibration level selector switch 28 coupled to the electronics 20 and configured to input a vibration threshold level or setpoint such that when sensed vibration meets or exceeds that threshold level the alert device 10 will actuate and cause the alert signal (visual and/or audible) to be emitted. Values of the vibration threshold may be selected from preset values or, alternatively, may be selected as specific values. Preset vibration threshold values (or set points) can be implemented by analog or digital bistable circuits in the electronics 20 or programmed into firmware in the electronics 20. Specific vibration threshold values can be input into the processing system implemented by the electronics 20 using a user interface such as a display and pushbuttons to adjust the vibration threshold value. In embodiments of the alert device 10 having multiple pre-programmed setpoints, the vibration level selector switch 28 can be used to select a user desired setpoint. In one or more embodiments, the vibration level selector switch 28 is configured to input between two and four vibration level values.

Figure 4:
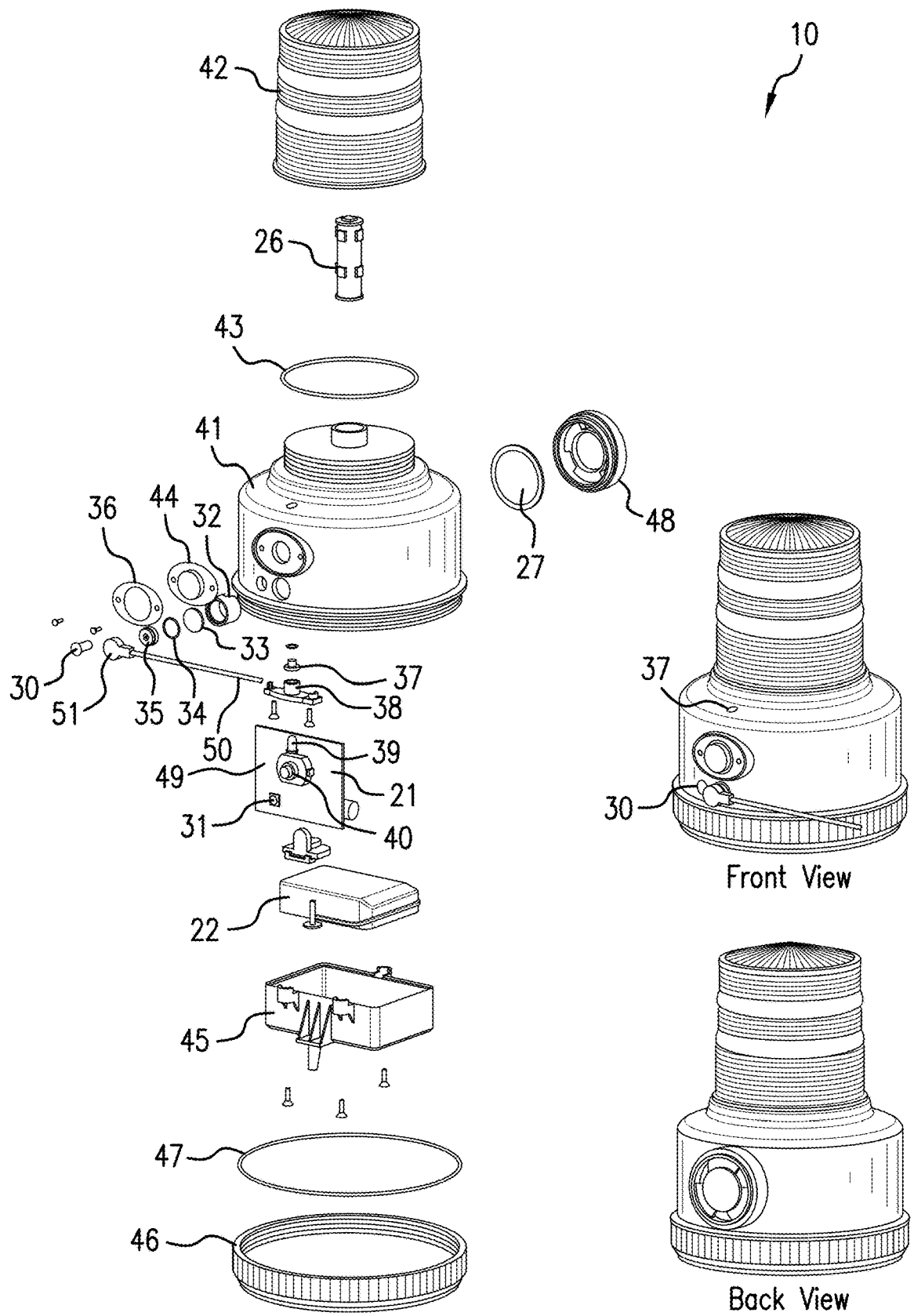
FIG. 4 depicts aspects of the alert device in an exploded view, a front view, and a back view.

FIG. 4 illustrates an exploded view of one embodiment of the alert device 10 along with a front view and a back view. As can be seen in the embodiment of FIG. 4, the alert device 10 includes various components to enable the alert device to survive exposure to the environment. For example, these components include a lens, various gaskets, a rubber switch cover, an acoustic transducer cover, a housing, and a base cover. In one or more embodiments, the base cover may include the connecting device 11 as illustrated in FIG. 1. Also illustrated in the embodiment of FIG. 4 is a stand-by indicator light and lens that are configured to illuminate when the alert device in an "ON" state and ready to sense vibration. Further illustrated in FIG. 4 is a charging indicator light and lens that are configured to illuminate when the battery 22 of the alert device 10 is being charged. In the embodiment of FIG. 4, the vibration sensor 21 is a ball switch.

In the embodiment of FIG. 4, the alert device 10 specifically includes a base 41 and a lens 42 that encloses the light emitter 26, which is an LED tree. The lens 42 is secured to the base 41 by a threaded connection having a gasket 43. The lens 42 may have a shape to focus light in a selected pattern such as to intensify brightness (e.g., a Fresnel lens) and/or may act as protective cover to the light emitter 26. In one or more embodiments, the base 41 is made of plastic or composite material. The alert device 10 also includes a rechargeable battery 22 that is disposed in a battery box 45. The battery box is disposed in the base 41 and enclosed in the base 41 by a base cover 46. The base cover 46 is secured to the base by a threaded connection having a gasket 47. The alert device 10 further includes the acoustic transducer 27 that is protected from the environment by transducer cover 48, which may include a gasket. The alert device 10 further includes a circuit board 49 to which is mounted the vibration sensor 21 which is a vibration ball switch sensor. The alert device 10 further includes a power or on-off switch 40 (e.g., a push button switch) mounted on the circuit board 49. The power switch 40 is coupled to the battery 22 and the vibration ball switch sensor 21 to provide power to the vibration ball switch sensor 21 when the power switch 40 is in the ON position. A standby indicator light 39 is coupled to the power switch 40 and is illuminated when the power switch 40 is in the ON position. A standby indictor light mount 38 secures the standby indicator light 39 to the base 41. A standby indicator light lens 37, generally red in color, covers the standby indicator light 39. A rubber or pliable switch cover 44 covers the power switch 40 and is secured to the base 41 by a switch cover 36. A charging plug receptacle 35, a charging port gasket 34, a charging circuit board 33, and charging socket 32 are secured to the base 41. A charging light 31 is disposed on the circuit board 49 and is coupled to the charging plug receptacle 35 such that the charging light 31 will illuminate when the battery 22 is being charged. A charging light lens 30, generally green in color, covers the charging light 31 and is disposed in the base 41 adjacent to the charging socket 32. Also illustrated in FIG. 4 is a charging cable 50 having a charging plug 51 at one end that is configured to mate with the charging plug receptacle 35 for charging the battery 22. The charging circuit board 33 may include and be representative of a coil for receiving energy from the charging cable 50 by magnetic induction in one or more embodiments.

Figure 5:
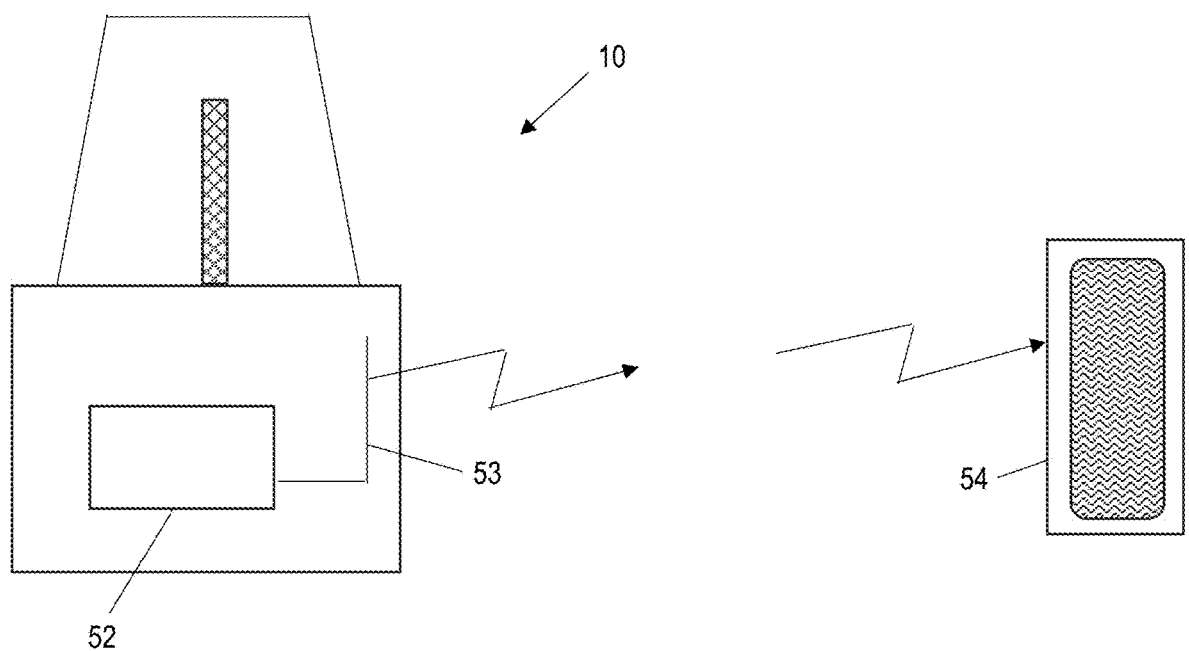
FIG. 5 depicts aspects of a wireless transmitter in the alert device.

The alert device 10 may include a wireless transmitter 52 coupled to an antenna 53 for transmitting a radio or wireless signal (e.g., Bluetooth or Wi-Fi) to a receiver 54 of a user notifying the user that the alert device 10 has sensed a vibration level that meets or exceeds the vibration threshold level as illustrated in FIG. 5. Non-limiting embodiments of the receiver 54 include a mobile device such as a cell phone, tablet, or dedicated receiver.

Figure 6:
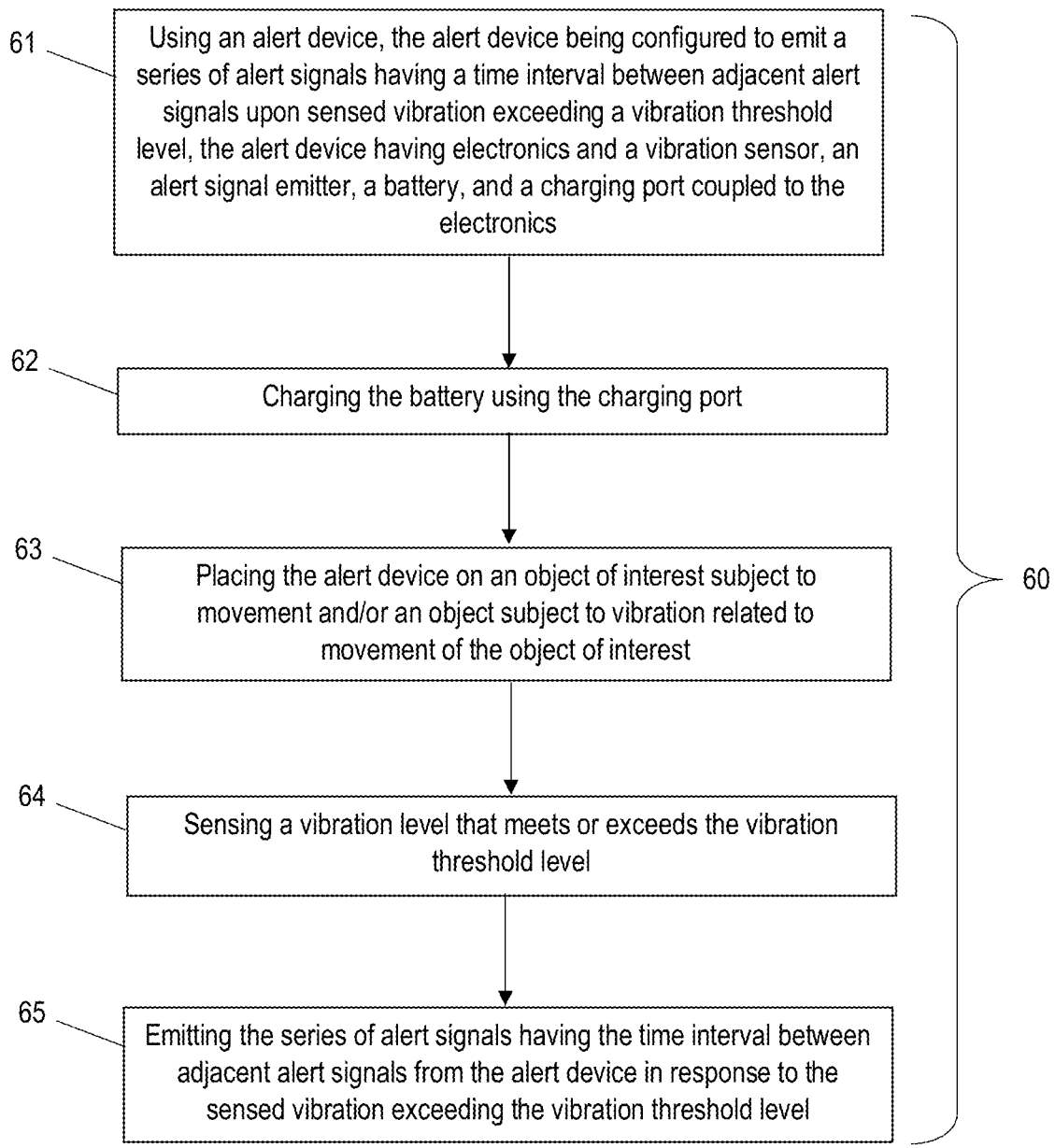
FIG. 6 is a block chart for a method for detecting movement of an object of interest.

FIG. 6 is a block chart for a method 60 for detecting movement of an object of interest. Block 61 calls for using an alert device, the alert device being configured to emit a series of alert signals having a time interval between adjacent alert signals upon sensed vibration exceeding a vibration threshold level, the alert device having electronics and a vibration sensor, an alert signal emitter, a battery, and a charging port coupled to the electronics. Block 62 calls for charging the battery using the charging port. Block 63 calls for placing the alert device on an object of interest subject to movement and/or an object subject to vibration related to movement of the object of interest. Block 64 calls for sensing a vibration level that meets or exceeds a vibration threshold level. Block 65 calls for emitting the series of alert signals having the time interval between adjacent alert signals from the alert device in response to the sensed vibration meeting or exceeding the vibration threshold level. The alert signal can be a visual signal and/or an audible signal. Inherently, the series of alert signals will not be emitted if the sensed vibration does not meet or exceed the vibration threshold level.

The method 60 may also include inputting a first time interval ($T_{ON}$) during which each alert signal in the series is emitted.

The method 60 may also include inputting a second time interval ($T_{OFF}$) during which no alert signal in the series is emitted.

The method 60 may also include inputting the vibration threshold level.

The method 60 may also include inputting a selection that the alert signal includes a visual signal, an audio signal, or both a visual signal and an audio signal.

The method 60 may also include transmitting a wireless signal from the alert device indicating that the vibration threshold level has been met or exceeded in response to the vibration sensor sensing a vibration level that meets or exceeds the vibration threshold level. Stated in other words, the wireless signal will be emitted when the alert device emits the alert signal. A receiver worn by a user will receive the wireless signal to provide indication to the user of the alert signal being emitted.

The use of the terms "a" and "an" and "the" and similar referents in the context of describing the invention (especially in the context of the following claims) are to be construed to cover both the singular and the plural, unless otherwise indicated herein or clearly contradicted by context. The conjunction "or" when used with a listing of at least two terms is intended to mean any term or combination of terms. Further, it should be noted that the terms "first," "second," and the like herein do not denote any order, quantity, or importance, but rather are used to distinguish one element from another. The terms "including" and "having" and the like are intended to be inclusive such that there may be additional elements other than the elements listed. The term "coupled" relates to a first item being coupled either directly to a second item or indirectly through an intermediate item. The term "configured" relates one or more structural limitations of a device that are required for the device to perform the function or operation for which the device is configured.

The disclosure illustratively disclosed herein may be practiced in the absence of any element which is not specifically disclosed herein. In other words, the alert light may be described in certain embodiments as omitting or excluding any element which is not specifically disclosed herein.

The invention has been described with reference to certain preferred embodiments. However, the invention is not to be so limited to such disclosure but encompasses all variations and modifications that would be apparent to one of ordinary skill in the art at the time of the invention.

What is claimed is:

1. An apparatus for detecting movement of an object of interest, the apparatus comprising:
    a base;
    a rechargeable battery disposed in a battery box in the base;
    a base cover configured to enclose a bottom portion of the base;
    electronics disposed in the base;
    a vibration ball switch sensor in power communication with the battery and coupled to the electronics;
    a light emitter comprising a plurality of light-emitting-diodes (LEDs) and coupled to the electronics;
    a lens at least partially enclosing the light emitter;
    a sound emitter coupled to the electronics;
    a sound emitter cover at least partially surrounding the sound emitter;
    an on-off switch disposed in the base and coupled to the electronics and in power communication with the battery;
    a pliable switch cover disposed over and sealing the on-off switch;
    a standby indicator light coupled to the electronics and configured to indicate that the apparatus is operational;
    a charging port disposed in the base and in power communication with the battery, the charging port configured to interface with a charging plug of a charging cable; and
    a charging indicator light coupled to the electronics and configured to indicate charging of the battery;
    wherein base cover is secured to the base by a first threaded connection and the lens is secured to the base by a second threaded connection.

2. The apparatus according to claim 1, wherein the charging port comprises a charging port circuit board and a charging port receptacle configured to interface with the charging plug of the charging cable.

3. The apparatus according to claim 2, wherein the charging port circuit board is configured to receive energy from the charging cable by magnetic induction.

4. The apparatus according to claim 1, wherein the electronics comprises a timing circuit for pulsing the light emitter and the sound emitter to provide a series of alert signals, each alert signal separated by a time interval in which no alert signal is emitted.

5. A method for detecting movement of an object of interest, the method comprising:
    using an alert device comprising a base; a rechargeable battery disposed in a battery box in the base; a base cover configured to enclose a bottom portion of the base; electronics disposed in the base; a vibration ball switch sensor in power communication with the battery and coupled to the electronics; a light emitter comprising a plurality of light-emitting-diodes (LEDs) and coupled to the electronics; a lens at least partially enclosing the light emitter; a sound emitter coupled to the electronics; a sound emitter cover at least partially surrounding the sound emitter; an on-off switch disposed in the base and coupled to the electronics and in power communication with the battery; a pliable switch cover disposed over and sealing the on-off switch; a standby indicator light coupled to the electronics and configured to indicate that the apparatus is operational; a charging port disposed in the base and in power communication with the battery, the charging port configured to interface with a charging plug of a charging cable; and a charging indicator light coupled to the electronics and configured to indicate charging of the battery; wherein base cover is secured to the base by a first threaded connection and the lens is secured to the base by a second threaded connection, and configured to emit energy in response to the vibration sensor sensing vibration exceeding a threshold value;
    placing the alert device on an object of interest subject to movement or another object subject to vibration related to movement of the object of interest;
    sensing a vibration level that meets or exceeds a vibration threshold value using the alert device; and
    emitting energy from at least one of the light emitter or the sound emitter in response to the vibration sensor sensing vibration exceeding the threshold value to detect movement of the object of interest.

6. The method according to claim 5, wherein the another object comprises a derailer.

7. The method according to claim 5, wherein placing comprises securing the alert device to the object or the another object using a connecting device coupled to the alert device.

8. The method according to claim 5, wherein emitting energy comprises emitting a series of alert signals, each alert signal separated by a time interval in which no alert signal is emitted.

* * * * *